United States Patent
Wang et al.

(10) Patent No.: US 8,239,133 B2
(45) Date of Patent: Aug. 7, 2012

(54) GLOBAL POSITIONING SYSTEM AND DEAD RECKONING (GPSANDDR) INTEGRATED NAVIGATION SYSTEM

(75) Inventors: James Wang, San Jose, CA (US); Xiaoguang Yu, Wuhan (CN); Zhongbao Feng, Sichuan (CN); Yiliang Liu, Sichuan (CN); Shenghong Lu, Sichuan (CN)

(73) Assignee: O2Micro, International, Georgetown (KY)

(*) Notice: Subject to any disclaimer, the term of this patent is extended or adjusted under 35 U.S.C. 154(b) by 440 days.

(21) Appl. No.: 12/495,349

(22) Filed: Jun. 30, 2009

(65) Prior Publication Data
US 2010/0030470 A1 Feb. 4, 2010

Related U.S. Application Data

(60) Provisional application No. 61/133,743, filed on Jul. 2, 2008.

(51) Int. Cl.
*G01S 19/47* (2010.01)
(52) U.S. Cl. ................... 701/472; 342/357.31
(58) Field of Classification Search .......... 701/216, 701/200, 213, 217, 400, 411, 422, 445, 468–473, 701/500–503; 342/357.31; 702/95
See application file for complete search history.

(56) References Cited

U.S. PATENT DOCUMENTS

| | | | | |
|---|---|---|---|---|
| 5,311,195 A | * | 5/1994 | Mathis et al. | 342/357.29 |
| 5,416,712 A | * | 5/1995 | Geier et al. | 701/216 |
| 7,512,487 B1 | * | 3/2009 | Golding et al. | 701/202 |
| 2007/0252754 A1 | | 11/2007 | Alexander | |

FOREIGN PATENT DOCUMENTS

| | | |
|---|---|---|
| EP | 1903306 A2 | 3/2008 |
| WO | 9849577 A2 | 11/1998 |
| WO | 02099453 A2 | 12/2002 |

* cited by examiner

*Primary Examiner* — Dalena Tran
(74) *Attorney, Agent, or Firm* — Wang Law Firm, Inc.; Li K. Wang (57) ABSTRACT

A global positioning system and dead reckoning (GPS&DR) integrated navigation system includes a GPS receiver coupled to a moving object for periodically generating GPS navigation information of said moving object, a DR system coupled to said moving object for periodically calculating DR navigation information of said moving object, and a filter coupled to said GPS receiver and said DR system for periodically calculating navigation information of said moving object, wherein said filter gets observation information by integrating said GPS navigation information and said DR navigation information according to a weight value of said GPS navigation information and a weight value of said DR navigation information, and calculates a current navigation information by integrating said observation information with previous navigation information from a plurality of previous cycles.

19 Claims, 5 Drawing Sheets

GLOBAL POSITIONING SYSTEM AND DEAD RECKONING (GPSANDDR) INTEGRATED NAVIGATION SYSTEM

RELATED APPLICATION

This application claims priority to U.S. Provisional Application No. 61/133,743, Global Positioning System And Dead Reckoning (GPS&DR) Integration Navigation System, filed on Jul. 2, 2008, which is hereby incorporated by reference in its entirety.

BACKGROUND OF THE INVENTION

1. Field of the Invention

The present invention relates to navigation systems and in particular to a global positioning system and dead reckoning (GPS&DR) integrated navigation system.

2. Description of Prior Art

A global positioning system (GPS) has been widely applied for vehicle navigation to provide an absolute position of a vehicle according to satellite signals since the GPS has the advantages of having global reach and having relatively high precision. However, it may be impossible to realize continuous navigation by the GPS in an urban area where satellite signals are obstructed by tall buildings, trees, tunnels, or the satellite signals are disturbed seriously, etc.

A dead reckoning (DR) navigation system, mainly composed of localization sensors (e.g., gyroscope, milemeter, etc.), is a self-contained, autonomous and high sampling rate navigation system. However, since the current absolute position of a vehicle is determined by adding a relative displacement calculated currently to a previous absolute positioning point in the DR navigation system, the error of the DR navigation system can accumulate with time.

SUMMARY OF THE INVENTION

The present invention provides a global positioning system and dead reckoning (GPS&DR) integrated navigation system. The GPS&DR integrated navigation system includes a GPS receiver coupled to a moving object for periodically generating GPS navigation information of said moving object, a DR system coupled to said moving object for periodically calculating DR navigation information of said moving object, and a filter coupled to said GPS receiver and said DR system for periodically calculating navigation information of said moving object, wherein said filter calculates observation information by integrating said GPS navigation information and said DR navigation information according to a weight value of said GPS navigation information and a weight value of said DR navigation information, and calculates current navigation information by integrating said observation information with previous navigation information from a plurality of previous cycles.

In another embodiment, the present invention provides a method for providing navigation information of a moving object. The method includes generating GPS navigation information of said moving object by a GPS receiver, calculating DR navigation information of said moving object by a DR system, calculating observation information by integrating said GPS navigation information and said DR navigation information according to a weight value of said GPS navigation information and a weight value of said DR navigation information at a filter, and calculating current navigation information by integrating said observation information with previous navigation information from a plurality of previous cycles at said filter.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION OF THE INVENTION

Reference will now be made in detail to the embodiments of the present invention. While the invention will be described in conjunction with the embodiments, it will be understood that they are not intended to limit the invention to these embodiments. On the contrary, the invention is intended to cover alternatives, modifications and equivalents, which can be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention can be practiced without these specific details. In other instances, well known methods, procedures, components, and circuits have not been described in detail as not to unnecessarily obscure aspects of the present invention.

Figure 1:
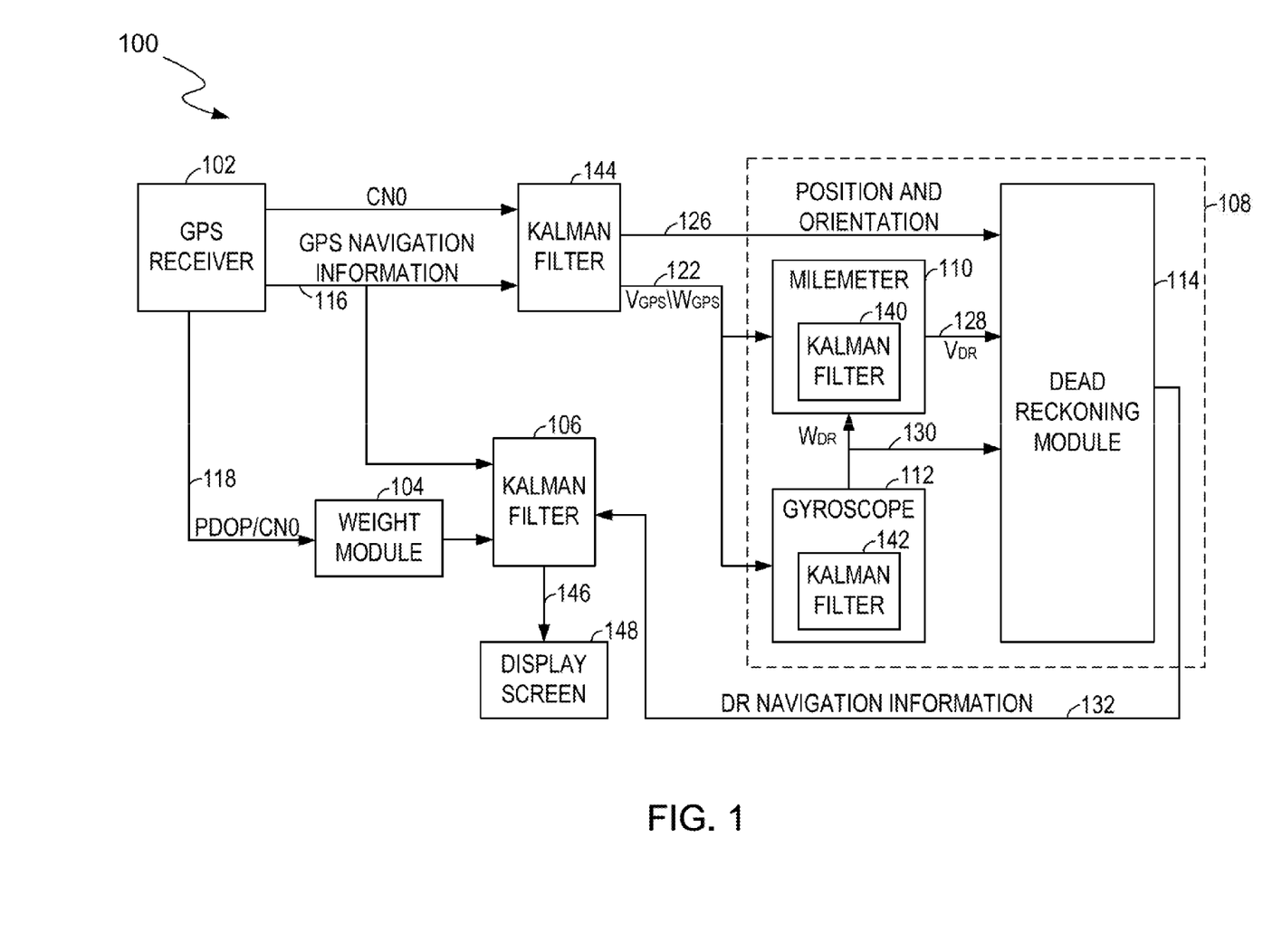
FIG. 1 illustrates a block diagram of a global positioning system and dead reckoning (GPS&DR) integrated navigation system according to one embodiment of the present invention.

FIG. 1 illustrates a block diagram of a GPS&DR (global positioning system & dead reckoning) integrated navigation system 100 according to one embodiment of the present invention. The GPS&DR integrated navigation system 100 can provide more accurate navigation capability than a single navigation system, for example, a single GPS navigation system or a single DR navigation system.

In one embodiment, the GPS&DR integrated navigation system 100 can include a GPS receiver 102 for receiving satellite signals and for generating GPS navigation information 116 according to the satellite signals. Each satellite signal is generated from a corresponding navigation satellite. In one embodiment, the GPS navigation information 116 includes a position, an orientation, a linear velocity ($V_{GPS}$) and an angular velocity ($W_{GPS}$) of a moving object (e.g., a vehicle). In the standard coordinate frame for the earth, the position of the vehicle consists of a longitude component and a latitude component.

The GPS&DR integrated navigation system 100 can further include a dead reckoning (DR) system 108 for providing DR navigation information of the vehicle by measuring moving information of the vehicle and integrating the moving information of the vehicle with reference position and orientation of the vehicle. The moving information of the vehicle includes a linear velocity and an angular velocity of the vehicle. The DR navigation information includes a position, an orientation, and the moving information of the vehicle. The reference position and orientation of the vehicle in the DR system 108 can be periodically updated with the position and orientation generated from the GPS receiver 102 if the received satellite signals are determined as reliable, and with the previously stored position and orientation calculated by the DR system 108 If the received satellite signals are determined as unreliable.

The DR system 108 includes a milemeter 110 for measuring the linear velocity $V_{DR}$ 128 of the vehicle, a gyroscope 112 for measuring the angular velocity $W_{DR}$ 130 of the vehicle, and a dead reckoning (DR) module 114 for calculating the position and orientation of the vehicle by integrating the moving information of the vehicle with the reference position and orientation of the vehicle. Since the linear velocity $V_{DR}$ 128 and the angular velocity $W_{DR}$ 130 measured by the milemeter 110 and the gyroscope 112 respectively may have a deviation relative to the real values, the milemeter 110 and the gyroscope 112 need to reduce the deviation of the linear velocity $V_{DR}$ 128 and the angular velocity $W_{DR}$ 130 respectively.

In one embodiment, the parameters of the milemeter 110 and the gyroscope 112 can be used to reduce the deviation of the linear velocity $V_{DR}$ 128 and the angular velocity $W_{DR}$ 130 respectively. The parameters of the gyroscope 112 can include, but are not limited to, a zero drift and a scale factor of the gyroscope 112. The parameters of the milemeter 110 can include, but are not limited to, the pulse number per circle of a tire of the vehicle, rolling radius of the tire, the proportionality factor representing the rolling radius of the tire divided by a linear velocity, and a static error of the rolling radius of the tire. However, the parameters of the milemeter 110 and the gyroscope 112 may continue to vary with time. Therefore, the milemeter 110 and the gyroscope 112 can each include a Kalman filter 140, 142 for estimating the values of the current parameters of the milemeter 110 and the gyroscope 112 periodically. After reducing the deviation related to the real values, the linear velocity $V_{DR}$ 128 and angular velocity $W_{DR}$ 130 can be output to the DR module 114 for further operation.

In one embodiment, the angular velocity 130 can be output to the milemeter 110 for determining whether the condition for estimating the values of the parameters of the milemeter 110 is satisfied. In another embodiment, the linear velocity 128 can be output to the gyroscope 112 for determining whether the condition for estimating the value of parameters of the gyroscope 112 is satisfied.

In one alternative embodiment, an additional filter (e.g., a Kalman filter) 144 can be coupled between the GPS receiver 102 and the DR system 108 for reducing noise within the GPS navigation information 116. Furthermore, the Kalman filter 144 can determine whether the satellite signals received at the GPS receiver 102 are reliable according to a carrier-to-noise ratio (CN0) of the satellite signals and the linear velocity $V_{GPS}$ of the vehicle output from the GPS receiver 102. If the number of the satellite signals with the carrier-to-noise ratio above a predetermined threshold, e.g., 30 dB-Hz, is greater than a predetermined value, e.g., three, and an average value of the linear velocity $V_{GPS}$ is greater than a predetermined threshold, e.g., 6 m/s, the received satellite signals can be determined as reliable. Otherwise, the received satellite signals can be determined as unreliable.

If the satellite signals received at the GPS receiver 102 are reliable, the GPS navigation information calculated according to the received satellite signals can be determined as reliable. The Kalman filter 144 can reduce the noise of the GPS navigation information 116 and send the position and the orientation of the vehicle 126 indicated in the corrected GPS navigation information to the DR module 114 for updating the reference position and orientation stored in the DR module 114.

The Kalman filter 144 can also output the linear velocity $V_{GPS}$ and the angular velocity $W_{GPS}$ indicated in the GPS navigation information 116 to the milemeter 110 and the gyroscope 112 for the parameter estimation.

The DR module 114 can receive a linear velocity 128 from the milemeter 110 and an angular velocity 130 from the gyroscope 112. The DR module 114 can calculate the current position and orientation of the vehicle by integrating the linear velocity 128 and the angular velocity 130 with the reference position and orientation stored in the DR module 114. As present above, the reference position and orientation stored in the DR module 114 can be updated by the position and orientation 126 indicated in the GPS navigation information 116 if the GPS navigation information 116 is reliable.

In one embodiment, according to the standard coordinate frame for the Earth, the position of the vehicle is defined by a longitude component and a latitude component. The position can be obtained by calculating the longitude component and the latitude component. The longitude component and the latitude component can be calculated based on the linear velocity $V_{DR}$ and the longitude and latitude components of the reference position according to equation (1).

$$\begin{cases} newLon = oldLon + V_{DR\_E} * T/(R * \cos(oldLon)) \\ newLat = oldLat + V_{DR\_N} * T/R \end{cases} \quad (1)$$

newLon represents the longitude component of the current position. newLat represents the latitude component of the current position. oldLon represents the longitude component of the reference position. oldLat represents the latitude component of the reference position. $V_{DR\_E}$ represents an east component of the linear velocity $V_{DR}$. $V_{DR\_N}$ represents a north component of the linear velocity $V_{DR}$. T represents a unit interval of the linear velocity, e.g., 1 s. R represents the distance from the reference position to an origin of the standard coordinate frame for the Earth.

The orientation of the vehicle can be calculated according to equation (2).

$$newOri = oldOri + W_{DR} * T \quad (2)$$

newOri represents the current orientation. oldOri represents the reference orientation. T represents the unit interval of the angular velocity, e.g., 1 s.

If the GPS navigation information is not available, the reference position and orientation can be updated with the calculated position and orientation. Then the DR module 114 can calculate next position and orientation based on the updated reference position and orientation.

Furthermore, the GPS&DR integrated navigation system 100 can include a filter (e.g., Kalman filter) 106 coupled to the GPS receiver 102 and the DR system 108. The Kalman filter 106 can periodically get observation information by integrating the GPS navigation information 116 with the DR navigation information 132 according to a weight value of the GPS navigation information 116 (in short, GPS weight value) and a weight value of the DR navigation information 132 (in short, DR weight value). The Kalman filter 106 can further periodically calculate current navigation information by integrating said observation information with previous navigation information from a plurality of previous cycles. The navigation information 146 of the vehicle can then be displayed on a display screen 148.

In one embodiment, the GPS weight value and the DR weight value can be calculated by a weight module 104. The weight module 104 receives a position dilution of precision (PDOP) of the satellite signals and the carrier-to-noise ratio (CN0) of the satellite signals from the GPS receiver 102 and generates the GPS weight value and the DR weight value according to the PDOP and the CN0.

If the number of the satellite signals with CN0>30 db-hz is no less than a predetermined value (e.g., 3), the GPS weight value and the DR weight value can be determined by the PDOP. In this condition, the GPS weight value and the DR weight value are given by equation (3).

$$\beta_1 = \begin{cases} 0.99, & PDOP \leq 2 \\ 2/PDOP, & 2 < PDOP < 5 \\ 1/PDOP, & 5 < PDOP < 10 \\ 1/(2*PDOP), & 10 \leq PDOP \end{cases} \quad (3)$$

$$\beta_2 = 1 - \beta_1$$

$\beta_1$ represents the GPS weight value. $\beta_2$ represents the DR weight value.

If the number of the satellite signals with CN0>30 dB-Hz is less than the predetermined value (e.g., 3), the GPS weight value and the DR weight value are given by equation (4).

$$\begin{cases} \beta_1 = \beta_{PRE1}, \text{e.g.}, 0 \\ \beta_2 = \beta_{PRE2}, \text{e.g.}, 1 \end{cases} \quad (4)$$

Advantageously, the GPS&DR integrated navigation system 100 combines the short-term stability of the DR system 108 with the long-term stability of the GPS receiver 102 through the integration of the two systems. Since the GPS receiver 102 can receive the satellite signals in real time and an error of the GPS navigation information will not be accumulated with time, the position and orientation of a moving object (e.g., vehicle) determined by the GPS receiver 102 can have relatively high precision if the received satellite signals are reliable. Hence, the GPS navigation information 116 can be used for updating the reference position and orientation of the DR system 108 if the received satellite signals are reliable. As a result, the accumulated error of the DR system 108 can be reduced or eliminated by updating the reference position and orientation periodically.

Furthermore, random error may occur in the GPS receiver 102 in some uncertain conditions (e.g., when the vehicle stops before an object or the satellite signals are unreliable). Since the position and orientation of a moving object (e.g., vehicle) reckoned continuously by the DR system 108 has relatively high precision in the short term, the random error in the GPS navigation information 116 can be compensated by setting a relatively low GPS weight value and a relatively high DR weight value for the integration of the GPS navigation information 116 and the DR positioning information 132. As a result, compensation of the random error in the GPS navigation information 116 can smooth the GPS navigation tracking process. Therefore, the GPS&DR integrated navigation system 100 can provide advantages of higher accuracy, better reliability, and improved capability for tracking/receiving satellite signals.

Figure 2:
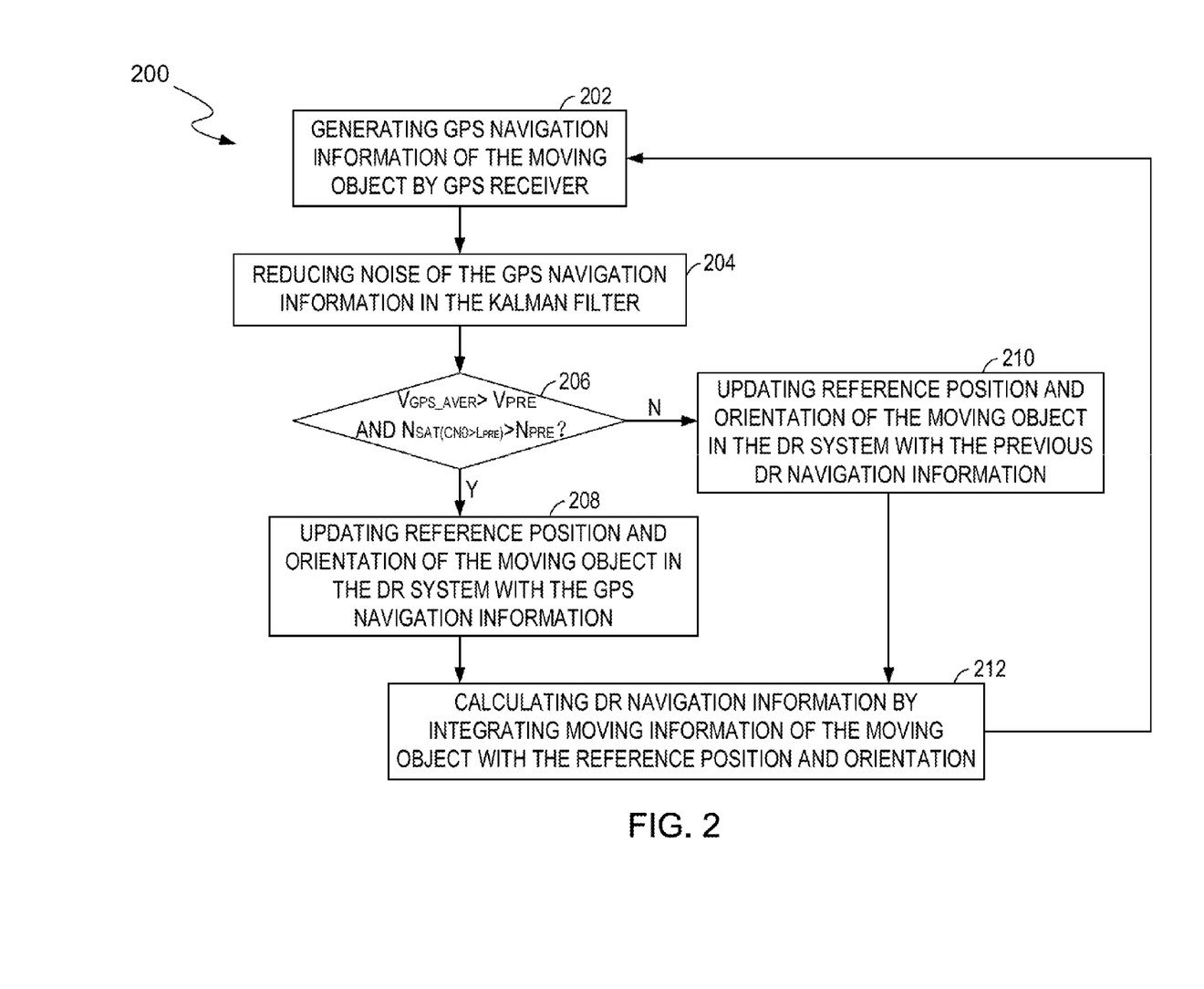
FIG. 2 illustrates a flowchart of updating a reference position and orientation of a DR system according to one embodiment of the present invention.

FIG. 2 illustrates a flowchart 200 of updating a reference position and orientation of a DR system (e.g., the reference position and orientation of the DR system 108 in FIG. 1) according, to one embodiment of the present invention. FIG. 2 is described in combination with FIG. 1.

In block 202, the GPS receiver 102 generates the GPS navigation information 116 according to satellite signals. In block 204, the Kalman filter 144 reduces the noise in the GPS navigation information 116. In block 206, the Kalman filter 144 determines a reliability of the received satellite signals according to the carrier-to-noise ratio (CN0) of the satellite signals and the linear velocity $V_{GPS}$ of the vehicle measured by the GPS receiver 102.

If an average value ($V_{GPS\_AVER}$) of the linear velocity ($V_{GPS}$) during a time interval, e.g., 90 seconds, is larger than a predetermined value $V_{PRE}$, e.g., 6 m/s, and the number of the satellite signals with the carrier-to-noise ratio above a predetermined threshold, e.g., 30 db-hz, is greater than a predetermined value, e.g., three, the received satellite signals can be determined as reliable. Then the reference position and orientation of the DR system 108 can be updated with the GPS navigation information that is corrected by the Kalman filter 144 in block 208.

If the average value ($V_{GPS\_AVER}$) of the linear velocity ($V_{GPS}$) during the time interval is not more than the predetermined velocity $V_{PRE}$, e.g., 6 m/s, or the number of the satellite signals with the carrier-to-noise ratio above the predetermined threshold, e.g., 30 db-hz, is not greater than the predetermined value $N_{PRE}$, e.g., three, the received satellite signals can be determined as unreliable. Then the reference position and orientation of the DR system 108 can be updated with the previous DR navigation information from a previous cycle in block 210.

In block 212, the DR system 108 can measure the moving information of the moving object by a plurality of motion sensors and calculate the DR navigation information by integrating the moving information with the reference position and orientation.

As shown, the error accumulated with time during the dead reckoning in the DR system 108 can be rectified timely by updating the reference position and orientation of the DR system 108 periodically. As result, when the satellite signals are determined as unreliable, the vehicle position can be calculated by the DR system 108 based on the reference position and orientation updated by the last reliable GPS navigation information. Consequently, smooth switching between the GPS receiver 102 and the DR system 108 can be achieved.

Figure 3:
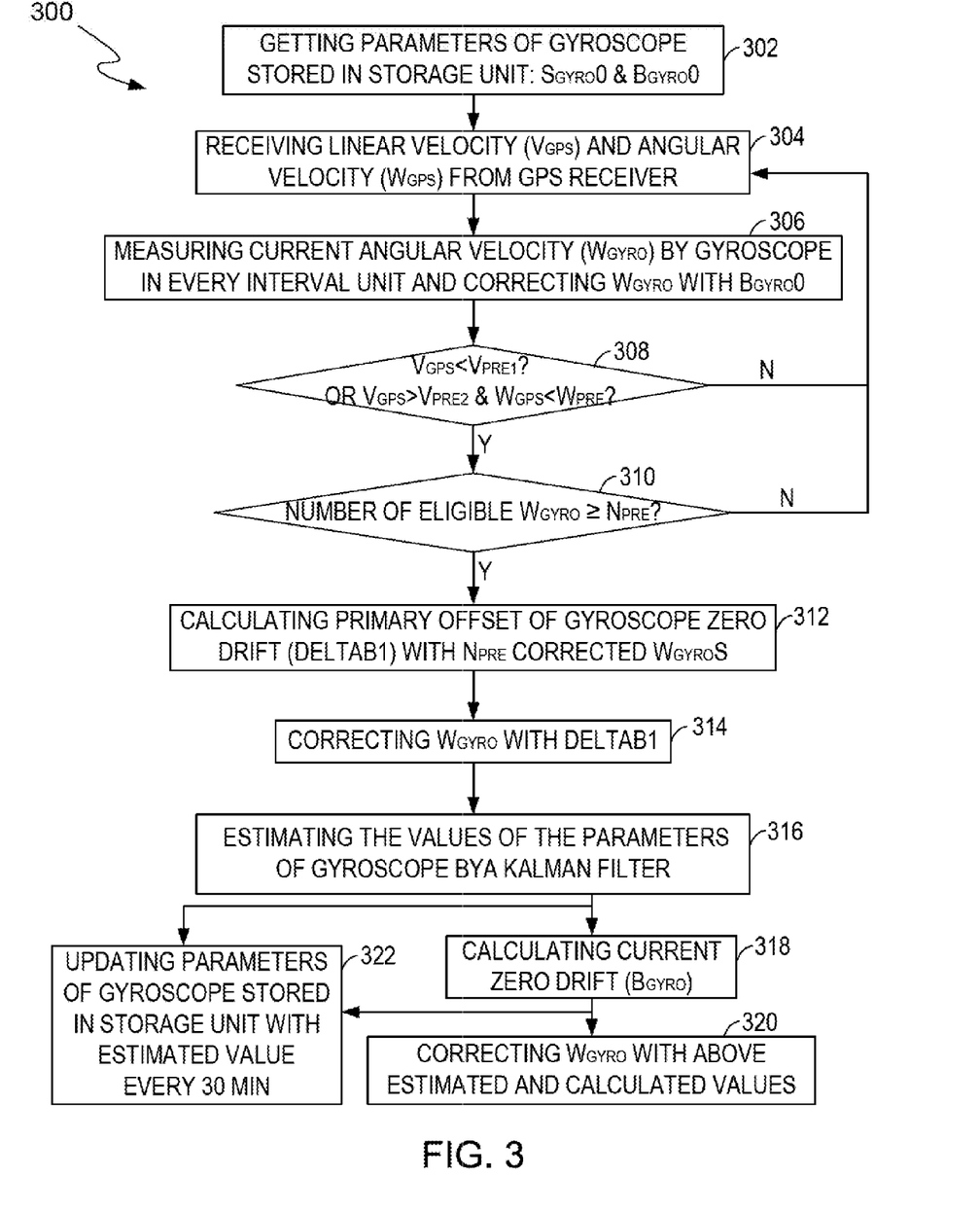
FIG. 3 illustrates a flowchart of estimating the values of parameters of a gyroscope according to one embodiment of the present invention.

FIG. 3 illustrates a flowchart 300 for estimating the values of parameters of a gyroscope (e.g., the gyroscope 112 in the DR system 108 in FIG. 1) according to one embodiment of the present invention. As described above, the parameters of the gyroscope 112 can be used to reduce the deviation of the angular velocity measured by the gyroscope 112. The parameters of the gyroscope 112 can include, but are not limited to, the zero drift and the scale factor of the gyroscope 112. Since the parameters of the gyroscope 112 continue to vary with time, which results from, e.g., an influence of a source degree of polarization, the values of the current parameters of the gyroscope 112 need to be estimated periodically during the navigation process. FIG. 3 is described in combination with FIG. 1.

When the GPS&DR integrated navigation system 100 is powered on, the GPS receiver 102 can start to operate. In block 302, initial parameters of the gyroscope 112 including an initial zero drift $B_{GYRO\_0}$ and an initial scale factor $S_{GYRO\_0}$ are read out from a storage unit (not shown in FIG.

1) included in the gyroscope 112. In another embodiment, the storage unit can be configured externally to the gyroscope 112. In block 304, the gyroscope 112 receives the linear velocity ($V_{GPS}$) and the angular velocity ($W_{GPS}$) from the GPS receiver 102. In block 306, an angular velocity $W_{GYRO}$ of a moving object, e.g., a vehicle, is measured by the gyroscope 112 and then the angular velocity can be corrected with the initial zero drift $B_{GYRO\_0}$ according to equation (5).

$$W_{GYRO}=W_{GYRO}+B_{GYRO\_0} \quad (5)$$

In block 308, if the $V_{GPS}$ is less than a predetermined threshold $V_{PRE1}$, which indicates that the vehicle has stopped, or if the $V_{GPS}$ is greater than a predetermined threshold $V_{PRE2}$ and the absolute value of the $W_{GPS}$ is less than a predetermined threshold $W_{PRE}$, which indicates that the vehicle is going straight, the angular velocity of the vehicle $W_{GYRO}$ corrected in block 306 is considered as eligible and stored in a storage unit (not shown in FIG. 1) for further calculation. In block 310, if the number of the eligible $W_{GYRO}$, which are stored in the storage unit, is no less then a predetermined threshold $N_{PRE}$, a primary offset of the zero drift is calculated with the eligible $W_{GYRO}$ that are stored in the storage unit in block 312. The primary offset of the zero drift can be given by equation (6)

$$deltaB1=-\text{mean}(W_{GYRO}) \quad (6)$$

deltaB1 represents the primary offset of the zero drift of the gyroscope 112. The function mean( ) is used for calculating an average value of the eligible $W_{GYRO}$. In one embodiment, the value of $N_{PRE}$ can be 50. After calculating the primary offset of the zero drift deltaB1, the storage unit can select the earliest angular velocity $W_{GYRO}$ among the eligible $W_{GYRO}$ and delete it.

If the $V_{GPS}$ is no less than the predetermined threshold $V_{PRE1}$ and no greater than the predetermined threshold $V_{PRE2}$, or the absolute value of the $W_{GPS}$ is no less than the predetermined threshold $W_{PRE}$ in block 308, or if the number of the eligible $W_{GYRO}$ is less then the predetermined threshold $N_{PRE}$ in block 310, the flowchart 300 will return to block 304.

In block 314, the angular velocity of the vehicle $W_{GYRO}$ corrected in block 306 can be corrected for the second time with the deltaB1 according to equation (7).

$$W_{GYRO}=W_{GYRO}+deltaB1 \quad (7)$$

In block 316, the angular velocity $W_{GPS}$ output from the GPS receiver 102, the angular velocity $W_{GYRO}$ corrected in block 314 and the initial scale factor $S_{GYRO}0$ are sent to the Kalman filter 142 in the gyroscope 112 for estimating the value of the parameters of the gyroscope 112. In one embodiment, the Kalman filter 142 can estimate the value of a secondary offset deltaB2 of the zero drift and a current scale factor $S_{GYRO}$.

In block 318, the current zero drift $B_{GYRO}$ of the gyroscope 112 can be calculated according to the primary offset deltaB1 of the zero drift, the secondary offset deltaB2 of the zero drift, and the initial zero drift $B_{GYRO}0$ according to equation (8).

$$B_{GYRO}=B_{GYRO}0+deltaB1+deltaB2 \quad (8)$$

In block 320, the angular velocity of the vehicle $W_{GYRO}$ can be corrected for the third time based on the current scale factor $S_{GYRO}$ estimated in block 316 and the $B_{GYRO}$ calculated in block 318 according to equation (9).

$$W_{GYRO}=S_{GYRO}*W_{GYRO}+B_{GYRO} \quad (9)$$

Then the $W_{GYRO}$ can be sent to the DR module 114 as the measured angular velocity $W_{DR}$ 130 of the vehicle for calculating the DR navigation information and to the milemeter 110 for controlling the parameters estimation of the milemeter 110, in one embodiment.

Additionally, after estimating the current scale factor $S_{GYRO}$ in block 316, and calculating the current zero drift $B_{GYRO}$ of the gyroscope 112 in block 318, the initial parameters of the gyroscope 112 including the initial zero drift $B_{GYRO\_0}$ and the initial scale factor $S_{GYRO\_0}$ stored in the storage unit can be updated with the $B_{GYRO}$ and the $S_{GYRO}$ respectively every predetermined time interval, e.g., 30 minutes, in block 322.

Figure 4:
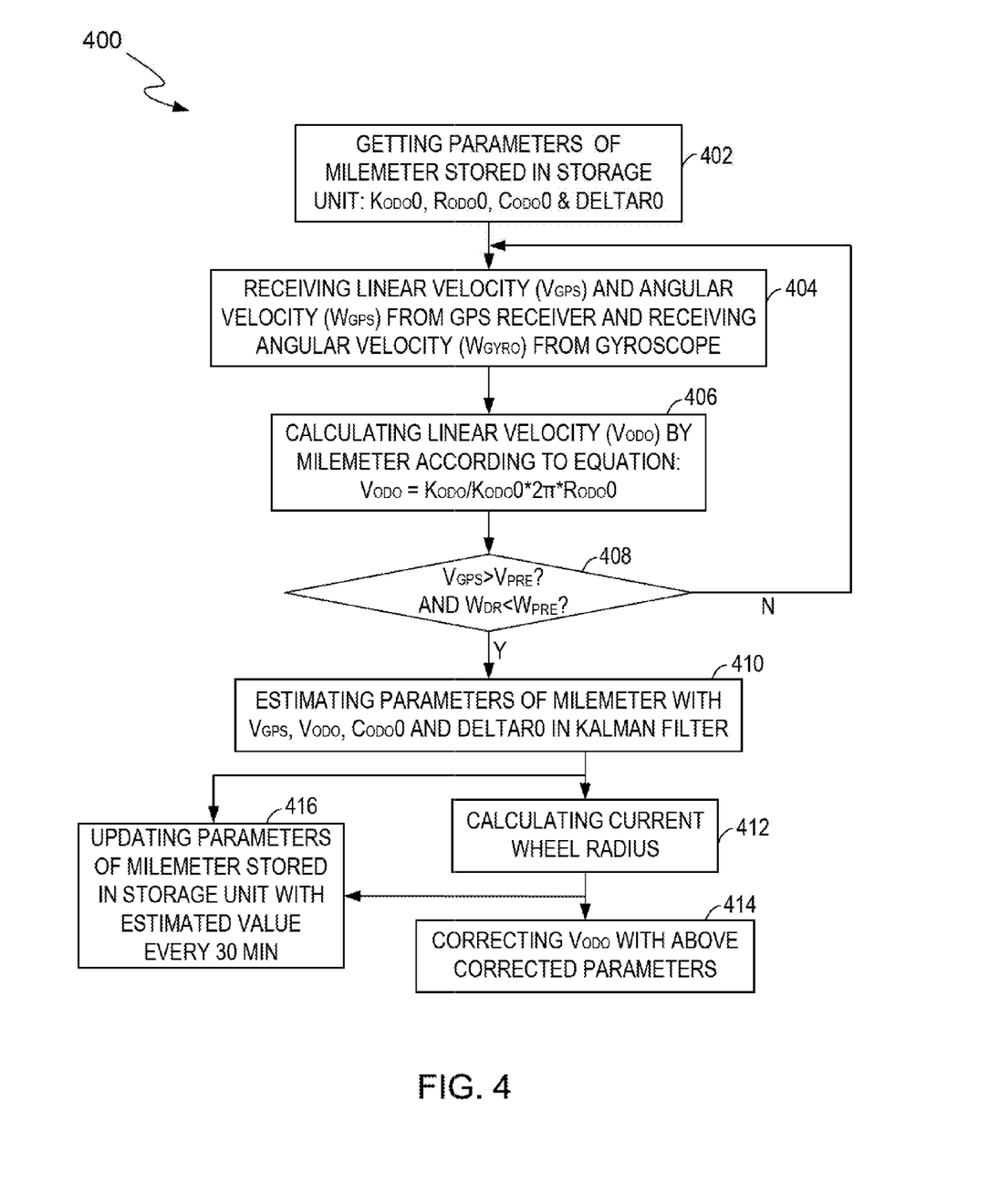
FIG. 4 illustrates a flowchart of estimating the values of parameters of a milemeter according to one embodiment of the present invention.

FIG. 4 illustrates a flowchart 400 of estimating the values of parameters of a milemeter (e.g., the milemeter 110 in the DR system 108 in FIG. 1) according to one embodiment of the present invention. As described above, the parameters of the milemeter 110 can be used to reduce the deviation of the linear velocity measured by the milemeter 110. The parameters of the milemeter 110 can include, but are not limited to, the pulse number per circle of the tire, the rolling radius of the tire, the proportionality factor representing the rolling radius of the tire divided by a linear velocity, and a static error of the rolling radius of the tire. Since the parameters of milemeter 110 continue to vary with time, which results from, e.g., wearing of a tire when the vehicle is running, the value of the current parameters of the milemeter 110 need to be estimated periodically during the navigation process. FIG. 4 is described in combination with FIG. 1.

When the GPS&DR integrated navigation system 100 is powered on, the GPS receiver 102 starts to operate. In block 402, initial parameters of the milemeter 110 including the pulse number per circle of the tire $K_{ODO}0$, an initial rolling radius of the tire $R_{ODO}0$, an initial proportionality factor $C_{ODO}0$, and an initial static error deltaR0 of the rolling radius of the tire are read out from a storage unit (not shown in FIG. 1) included in the milemeter 110. In one embodiment, the storage unit can be configured external to the milemeter 110. In block 404, the milemeter 110 receives the linear velocity ($V_{GPS}$) and the angular velocity ($W_{GPS}$) from the GPS receiver 102 and also receives the current angular velocity ($W_{DR}$) 130 from the gyroscope 112. In block 406, a pulse number per interval unit is counted by the milemeter 110 and then a linear velocity of a moving object, e.g., a vehicle, can be calculated based on the counted pulse number per interval unit, the pulse number per circle of the tire $K_{ODO}0$, and the initial rolling radius of the tire $R_{ODO}0$ according to equation (10).

$$V_{ODO}=K_{ODO}/K_{ODO}0*2\pi*R_{ODO}0 \quad (10)$$

$V_{ODO}$ represents the current linear velocity of the vehicle measured by the milemeter 110. $K_{ODO}$ represents the counted pulse amount per interval unit.

If the $V_{GPS}$ is greater than a predetermined threshold $V_{PRE}$ and the $W_{DR}$ 130 is less than a predetermined threshold $W_{PRE}$, which indicates that the vehicle is running in a normal condition in block 408, the $V_{ODO}$ is reliable for estimating the values of the parameters of the milemeter 110 in the next block 410. If the $V_{GPS}$ is no greater than the predetermined threshold $V_{PRE}$ or the $W_{DR}$ 130 is no less than the predetermined threshold $W_{PRE}$, which indicates that the vehicle is running in an abnormal condition in block 408, the flowchart 400 returns to block 404.

In block 410, the linear velocity $V_{GPS}$ measured by the GPS receiver 102, the linear velocity $V_{ODO}$ measured by the milemeter 110 in block 406, the initial proportionality factor $C_{ODO}0$, and the initial static error of the rolling radius of the tire deltaR0 are sent to the Kalman filter 140 included in the milemeter 110 for estimating values of the parameters of the milemeter 110. In one embodiment, the Kalman filter 140 can estimate the values of the current proportion factor $C_{ODO}$ and the current static error of the rolling radius of the tire deltaR.

In block 412, the current rolling radius of the tire can be calculated according to equation (11).

$$R_{ODO}=C_{ODO}*V_{ODO}+R_{ODO}0+\text{delta}R \tag{11}$$

$R_{ODO}$ represents the current rolling radius of the tire. $C_{ODO}$ represents the current proportionality factor. deltaR represents the current static error of the rolling radius of the tire. $V_{ODO}$ represents the linear velocity of the vehicle measured by the milemeter 110. $R_{ODO}0$ represents the initial rolling radius of the tire.

In block 414, the linear velocity calculated by the milemeter 110 is corrected based on the current rolling radius of the tire $R_{ODO}$, the pulse number per interval unit $K_{ODO}$, and the pulse number per circle of the tire $K_{ODO}0$ according to equation (12).

$$V_{ODO}=2\pi*R_{ODO}*K_{ODO}/K_{ODO}0 \tag{12}$$

Then the $V_{ODO}$ can be sent to the DR module 114 as the measured linear velocity $V_{DR}$ 128 of the vehicle for dead reckoning.

Additionally, after estimating the values of the $C_{ODO}$ and the deltaR in block 410, and calculating the $R_{ODO}$ in block 412, the initial parameters including the $C_{ODO}0$, the deltaR0 and the $R_{ODO}0$ of the milemeter 110 stored in the storage unit can be updated with the $C_{ODO}$, the deltaR and the $R_{ODO}$ respectively every predetermined time interval, e.g., 30 minutes, in block 416.

Figure 5:
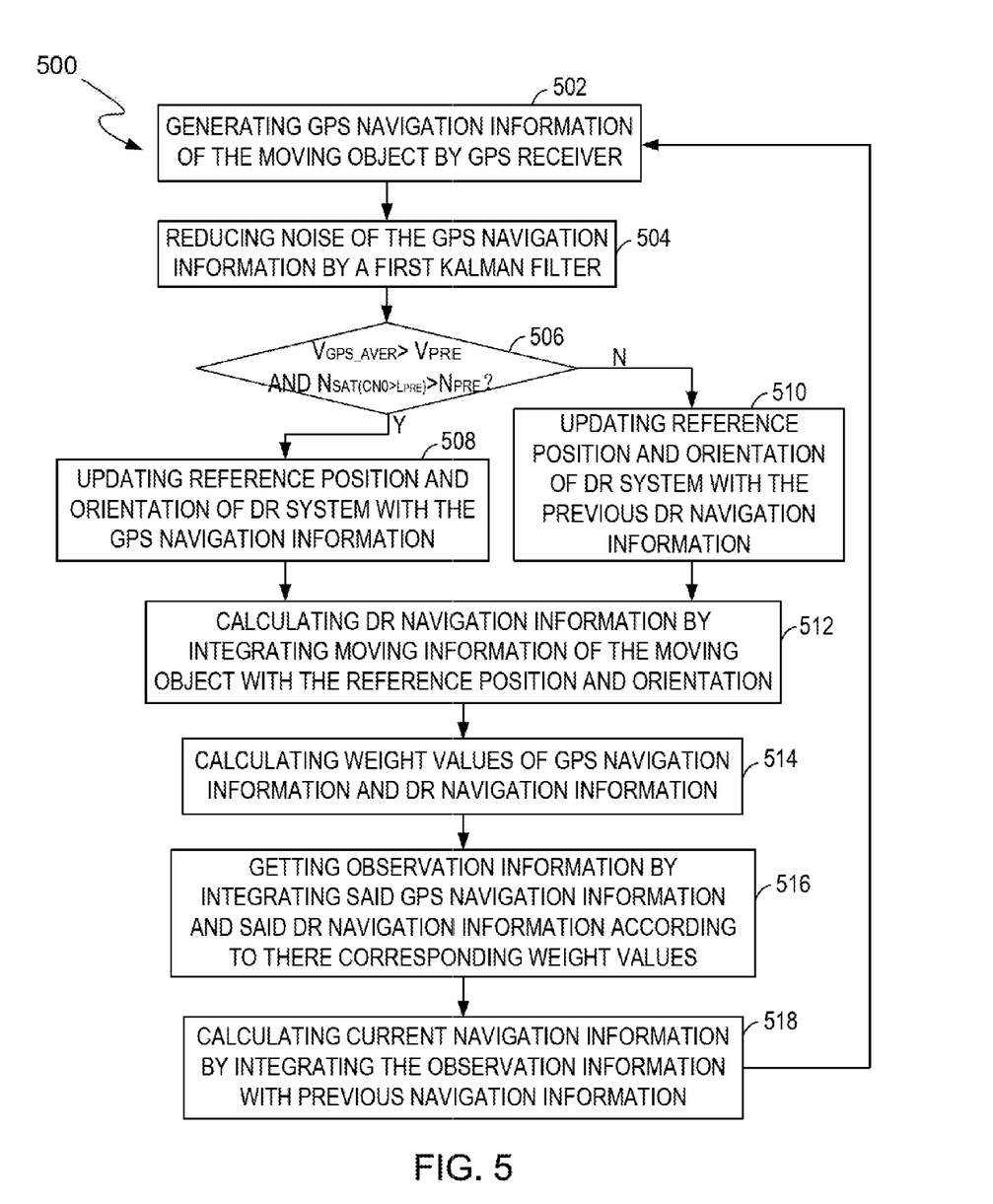
FIG. 5 illustrates a flowchart of operation performed by a GPS&DR integrated navigation system.

FIG. 5 illustrates a flowchart 500 of operation performed by a GPS&DR integrated navigation system (e.g. the GPS&DR integrated navigation system 100 in FIG. 1). FIG. 5 is described in combination with FIG. 1 and FIG. 2.

After the GPS&DR integrated navigation system 100 is powered on, the GPS receiver 102 starts to generate GPS navigation information 116 according to a plurality of satellite signals in block 502. In block 504, the Kalman filter 144 can reduce the noise within the GPS navigation information 116. In block 506, the Kalman filter 144 can determine the reliability of the received satellite signals according to the carrier-to-noise ratio (CN0) of the satellite signals and the linear velocity $V_{GPS}$ of the vehicle measured by the GPS receiver 102.

If an average value ($V_{GPS\_AVER}$) of the linear velocity ($V_{GPS}$) during a time interval, e.g., 90 seconds, is more than a predetermined velocity $V_{PRE}$, e.g., 6 m/s, and the number of the satellite signals with the carrier-to-noise ratio above a predetermined threshold, e.g., 30 db-hz, is greater than a predetermined value, e.g., three, the received satellite signals can be determined as reliable. Then the reference position and orientation of the DR system 108 can be updated with the GPS navigation information corrected by the Kalman filter 144 in block 508.

If the average value ($V_{GPS\_AVER}$) of the linear velocity ($V_{GPS}$) during the time interval is not more than the predetermined velocity $V_{PRE}$, e.g., 6 m/s, and the number of the satellite signals with the carrier-to-noise ratio above the predetermined threshold, e.g., 30 db-hz, is not greater than the predetermined value $N_{PRE}$, e.g., three, the received satellite signals can be determined as unreliable. Then the reference position and orientation of the DR system 108 can be updated with the previous DR navigation information from a previous cycle in block 510.

In block 512, the DR system 108 can measure the moving information of the moving object by a plurality of motion sensors and calculate the DR navigation information 132 by integrating the moving information with the reference position and orientation.

In block 514, the weight value of the GPS navigation information 116 and the weight value of the DR navigation information 132 are calculated by the weight module 104. In block 516, Kalman filter 106 can get observation information by integrating the GPS navigation information 116 with the DR navigation information 132 according to a weight value of the GPS navigation information 116 and a weight value of the DR navigation information 132. In block 518, the Kalman filter 106 can further calculate current navigation information by integrating the observation information with previous navigation information from a plurality of previous cycles.

Accordingly, the GPS&DR integrated navigation system 100 includes the GPS receiver 102 for generating GPS navigation information of the moving object according to a plurality of satellite signals, and the DR system 108 for calculating DR navigation information of the moving object by integrating moving information of the moving object with reference position and orientation. The reference position and orientation of the DR system 108 can be updated with the GPS navigation information if the satellite signals are determined as reliable, and can be updated with the previous DR navigation information from a previous cycle if the satellite signals are determined as unreliable. Furthermore, the moving information of the moving object can be measured by a plurality of motion sensors. The linear velocity and the angular velocity generated by the GPS receiver 102 can be input into the DR system 108 for estimating the parameters of the motion sensors and correcting the measured moving information according to the parameters. As a result, when GPS signals are determined as unreliable, the up to date parameters of the DR system 108 will be used for smooth switching between the GPS and DR navigation systems.

The GPS&DR integrated navigation system 100 further includes the Kalman filter 106 for calculating navigation information of the moving object by integrating the GPS navigation information and the DR navigation information according to a weight value of the GPS navigation information and a weight value of the DR navigation information. The weight module 104 can calculate the weight value of the GPS navigation information and the weight value of the DR navigation information according to a position dilution of precision and a carrier-to-noise ratio of the satellite signals.

While the foregoing description and drawings represent embodiments of the present invention, it will be understood that various additions, modifications and substitutions can be made therein without departing from the spirit and scope of the principles of the present invention as defined in the accompanying claims. One skilled in the art will appreciate that the invention can be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A global positioning system and dead reckoning (GPS&DR) integrated navigation system comprising:
   a GPS receiver coupled to a moving object for periodically calculating GPS navigation information of said moving object according to satellite signals;
   a DR system coupled to said moving object for periodically calculating DR navigation information of said moving object by integrating moving information of said moving object with reference position and orientation from said DR system;
   a filter coupled to said GPS receiver and said DR system for periodically calculating navigation information of said moving object, wherein said filter gets observation information by integrating said GPS navigation information and said DR navigation information according to a weight value of said GPS navigation information and a weight value of said DR navigation information, and said filter calculates a current navigation information by integrating said observation information with previous navigation information from a plurality of previous cycles; and
   a weight module coupled to said GPS receiver for calculating said weight value of said GPS navigation information and said weight value of said DR navigation information based on the number of said satellite signals with a carrier-to-noise ratio above a first predetermined threshold.

2. The GPS&DR integrated navigation system of claim 1, further comprising:
   a filter coupled to said GPS receiver for determining whether said satellite signals received at said GPS receiver are reliable according to said carrier-to-noise ratio of said satellite signals and a linear velocity of said moving object.

3. The GPS&DR integrated navigation system of claim 1, wherein said weight module calculates said weight value of said GPS navigation information and said weight value of said DR navigation information according to a position dilution of precision of said satellite signals if said number of said satellite signals with said carrier-to-noise ratio above said first predetermined threshold is greater than a second predetermined threshold.

4. The GPS&DR integrated navigation system of claim 1, wherein said weight module sets said weight value of said GPS navigation information with a first predetermined value and sets said weight value of said DR navigation information with a second predetermined value if said number of said satellite signals with said carrier-to-noise ratio above said first predetermined threshold is less than a second predetermined threshold.

5. The GPS&DR integrated navigation system of claim 1, further comprising:
   a filter coupled to said GPS receiver for reducing noise within said GPS navigation information.

6. The GPS&DR integrated navigation system of claim 1, wherein said reference position and orientation are updated said GPS navigation information if an average value of linear velocity of said moving object measured by said GPS receiver is greater than a second predetermined threshold, and the number of said satellite signals with said carrier-to-noise ratio above a third predetermined threshold is greater than a fourth predetermined threshold.

7. The GPS&DR integrated navigation system of claim 1, further comprising:
   A gyroscope coupled to said moving object for measuring an angular velocity of said moving object; and
   A milemeter coupled to said moving object for measuring a linear velocity of said moving object;
   wherein said moving information of said moving object comprises said angular velocity and said linear velocity.

8. The GPS&DR integrated navigation system of claim 7, wherein said gyroscope comprises a filter for estimating values of parameters of said gyroscope according to said angular velocity measured by said gyroscope and an angular velocity measured by said GPS receiver, wherein said gyroscope reduces deviation of said angular velocity according to said estimated values of said parameters.

9. The GPS&DR integrated navigation system of claim 7, wherein said milemeter comprises a filter for estimating values of parameters of said milemeter according to said linear velocity measured by said milemeter and a linear velocity measured by said GPS receiver, wherein said milemeter reduces deviation of said linear velocity according to said estimated values of said parameters.

10. The GPS&DR integrated navigation system of claim 1, further comprising a display screen for displaying said navigation information of said moving object from said filter.

11. A method for providing navigation information of a moving object through a global positioning system and dead reckoning (GPS&DR) integrated navigation system, said method comprising the steps of:
    calculating, through a GPS receiver, GPS navigation information of said moving object according to satellite signals received by said GPS receiver;
    calculating, through a DR system, DR navigation information of said moving object by integrating moving information of said moving object with reference position and orientation from said DR system;
    getting, through a filter, observation information by integrating said GPS navigation information and said DR navigation information according to a weight value of said GPS navigation information and a weight value of said DR navigation information;
    calculating, through said filter, a current navigation information by integrating said observation information with previous navigation information from a plurality of previous cycles; and
    calculating, through a weight module, said weight value of said GPS navigation information and said weight value of said DR navigation information based on the number of said satellite signals with a carrier-to-noise ratio above a first predetermined threshold.

12. The method of claim 11, further comprising the step of:
    determining whether said satellite signals received at said GPS receiver are reliable according to said carrier-to-noise ratio of said satellite signals and a linear velocity of said moving object.

13. The method of claim 11, wherein the step of calculating said weight value of said GPS navigation information said weight value of said DR navigation information according to said GPS navigation information further comprises the steps of:
    calculating said weight value of said GPS navigation information and said weight value of said DR navigation information according to a position dilution of precision of said satellite signals if said number of said satellite signals with said carrier-to-noise ratio above said first predetermined threshold is greater than a second predetermined threshold; and
    setting said weight value of said GPS navigation information with a first predetermined value and setting said weight value of said DR navigation information with a second predetermined value if said number of said satellite signals with said carrier-to-noise ratio above said first predetermined threshold is less than said second predetermined threshold.

14. The method of claim 11, further comprising the step of:
reducing noise within said GPS navigation information by a filter.

15. The method of claim 11, further comprising the steps step of:
updating said reference position and orientation according to said GPS navigation information if an average value of linear velocity of said moving object measured by said GPS receiver is greater than a second predetermined threshold, and the number of said satellite signals with said carrier-to-noise ratio above a third predetermined threshold is greater than a fourth predetermined value threshold.

16. The method of claim 11, further comprising the steps of:
measuring an angular velocity of said moving object by a gyroscope; and
measuring a linear velocity of said moving object by a milemeter;
wherein said moving information of said moving object comprises said angular velocity and said linear velocity.

17. The method of claim 16, further comprising the steps of:
estimating values of parameters of said gyroscope according to said angular velocity measured by said gyroscope and an angular velocity indicated in said GPS navigation information; and
reducing deviation of said angular velocity according to said estimated parameters.

18. The method of claim 16, further comprising the step of:
estimating values of parameters of said milemeter according to said linear velocity measured by said milemeter and a linear velocity indicated in said GPS navigation information; and
reducing deviation of said linear velocity according to said estimated parameters.

19. The method of claim 11, further comprising the step of displaying said navigation information of said moving object on a display screen.

* * * * *